Feb. 24, 1942.    P. C. GARDINER    2,274,364
VOLTAGE REGULATOR CIRCUIT
Filed March 8, 1940
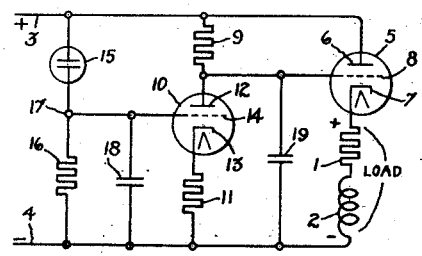
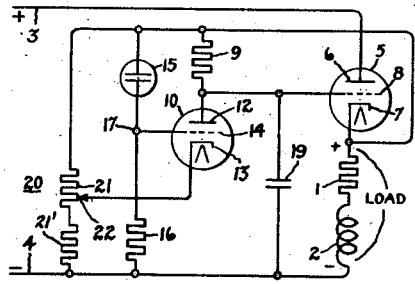
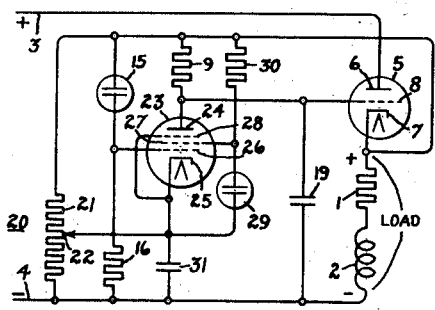
Inventor:
Paul C. Gardiner,
by Harry E. Dunham
His Attorney.

Patented Feb. 24, 1942

2,274,364

UNITED STATES PATENT OFFICE 2,274,364

VOLTAGE REGULATOR CIRCUIT

Paul C. Gardiner, Scotia, N. Y., assignor to General Electric Company, a corporation of New York Application March 8, 1940, Serial No. 322,919

11 Claims. (Cl. 171—312)

My invention relates to electric circuits and more particularly to electric valve regulator circuits.

Due to the precision of control afforded by the use of electric valve apparatus, circuits employing electric valves are being applied in increasing numbers to voltage control of electric power sources, such as sources of rectified voltage. In accordance with the teachings of my invention described hereinafter, I provide new and improved circuits including electric valves or electric discharge devices for controlling the voltage supplied to direct current load circuits.

It is an object of my invention to provide new and improved electric valve regulator circuits.

It is another object of my invention to provide new and improved electric valve voltage regulator circuits for maintaining the voltage supplied to a direct current load circuit at a substantially constant value.

It is another object of my invention to provide new and improved electric valve regulator circuits susceptible of maintaining the voltage applied to a direct current load circuit within a narrowly defined range of values and which is susceptible of providing a range of voltage control substantially greater than that afforded by prior art circuits susceptible of the same precision of control.

Briefly stated, in the illustrated embodiments of my invention I provide new and improved circuits including electric discharge devices or electric valves which regulate the magnitude of the voltage impressed on a direct current load circuit from a direct current supply circuit. The direct current supply circuit may be that provided by a rectifier energized from an alternating current circuit. The circuits which I provide employ a device, such as a glow discharge device, having a substantially constant arc drop when in a conducting condition and having a nonlinear current-impedance characteristic. In the embodiments of my invention described hereinafter the glow discharge devices are employed to increase the precision of operation of the regulator circuits and are so connected as to provide a greater range in output voltages than that afforded by the prior art arrangements. The circuits also afford a greater range in the adjustment of the output voltages and at the same time afford an improvement in the precision of operation.

For a better understanding of my invention, reference may be had to the following description taken in connection with the accompanying drawing, and its scope will be pointed out in the appended claims. Figs. 1, 2 and 3 illustrate diagrammatically embodiments of my invention for controlling the voltage applied to a direct current load circuit.

In many of the prior art arrangements in which electric discharge devices have been employed to control the magnitude of the voltage applied to a load circuit, such as a direct current load circuit, an improvement in the precision of operation has been obtained by using glow discharge devices which have been connected between the cathode and the negative terminal of the supply circuit or the negative terminal of the load circuit. It is known that in the usual form or embodiment of glow discharge devices employing ionizable mediums, such as neon, the arc drop across the electrodes of the device is in the neighborhood of 80 or 90 volts when the device is conducting and that the impedance to the flow of current is small. Accordingly, in order to suppress undesirable ripples or transients in the supply voltage and in the output voltage, it is necessary to employ filtering circuits having elements of larger value or rating than would be required if the impedance of the input circuit to the electric discharge devices were large. For example, where glow discharge devices are connected between the cathodes and the negative terminals of the supply circuit or the load circuit, the filtering capacitances must be relatively large to absorb the undesirable ripples. However, in the embodiments of my invention described hereinafter, I provide circuits which utilize the advantages incident to glow discharge devices in obtaining precision of operation without necessitating the use of capacitances of large value or rating, thereby permitting a reduction in size of the elements of the filtering circuit.

Referring now to Fig. 1 of the drawing, my invention is there illustrated as applied to a voltage regulating circuit for maintaining the voltage applied to a load circuit, such as a direct current load circuit, at a substantially constant value. The load circuit is represented as comprising a resistance 1 and an inductance 2. The load circuit is energized from a suitable source of direct current comprising a positive terminal 3 and a negative terminal 4. The supply circuit may be energized from the output circuit of a rectifier (not shown), and the arrangement described hereinafter may be employed as a means for regulating the output voltage of that circuit to maintain the voltage impressed on the load circuit at a constant value. To maintain the load voltage at a substantially constant value, I employ an electric discharge device 5 of the high vacuum type having a pair of principal electrodes, such as an anode 6 and a cathode 7, and having a control electrode or grid 8. The electric discharge device 5 operates as a variable impedance to control the magnitude of the voltage impressed on the load circuit.

As a means for varying the voltage of the supply circuit, I provide in series relation across the supply circuit an impedance element, such as a resistance 9, a control electric discharge device 10 and a second impedance such as a resistance 11. The control discharge device 10 comprises an anode 12, a cathode 13 and a control grid 14, and is also of the high vacuum type. The anode 12 of the discharge device 10 is connected to the grid 8 of the discharge device 5. The control discharge device 10 transmits variable amounts of unidirectional current through the resistance 9 and hence controls the potential of the grid 8. As an agency for controlling the conductivity of the control discharge device 10 in response to the magnitude of the voltage of the supply circuit, I employ a voltage divider comprising a glow discharge device 15 and a resistance 16, the common juncture 17 of which is connected to the grid 14 of discharge device 10. The glow discharge device 15 is preferably of the type employing an ionizable medium, such as a gas, preferably neon, and is connected between the positive terminal of the direct current supply circuit and the grid 14. The impedance of the input circuit of the control electric discharge device 10 is appreciable, due to the fact that the resistance 11 may be chosen to effect this condition. I provide filtering capacitances 18 and 19 connected between the negative terminal 4 and the grids 14 and 8 of discharge devices 10 and 5, respectively. These capacitances may be small due to the high impedance of the input circuit, thereby affording considerable improvement in apparatus economy.

The operation of the embodiment of my invention shown in Fig. 1 will be explained by considering the system when it is operating to maintain the voltage impressed on the load circuit at a substantially constant value. The electric discharge device 5 operates as a variable impedance to maintain the voltage of the load circuit constant. If it be assumed that the voltage of the supply circuit tends to rise above a predetermined value, the conductivity of the control discharge device 10 is increased by the action of the voltage divider including glow discharge device 15 and resistance 16 which raises the potential of the control grid 14. The incident increase of current through the resistance 9 lowers the potential of grid 8 of discharge device 5, virtually restoring the voltage impressed on the load circuit to the desired value. Conversely, if the voltage circuit tends to decrease, thereby effecting a corresponding decrease in the voltage impressed on the load circuit, the conductivity of the control discharge device 10 will be decreased, raising thereby the potential of the discharge device 5 and consequently raising the voltage impressed on the load circuit to the desired value.

Inasmuch as a resistance of appreciable magnitude is connected in the input circuit of the control electric discharge device 10, the size of the capacitances 18 and 19 may be substantially smaller than if the glow discharge device 15 were connected between the cathode 13 and the negative conductor 4. For low frequency ripples, capacitances 18 and 19 may be further reduced to cause reduction of the ripple occasioned by amplification. Furthermore, inasmuch as the glow discharge device 15 is connected between the positive conductor 3 and the grid 14, it is possible to design the circuit to obtain a greater range in the output voltage impressed on the load circuit than would be obtained if the glow discharge device were used in the cathode circuit of the control discharge device 10. I have found that whereas in the prior art arrangements voltage ranges were of the order of from 200 volts to 350 volts, by using the embodiments of my invention the load voltage range may be increased to extend from 100 volts to 350 volts.

Fig. 2 diagrammatically illustrates another embodiment of my invention in which similar elements have been assigned like reference numerals. In the arrangement of Fig. 2, the control electric discharge device 10 and its associated voltage controlling circuit is energized directly in response to the magnitude of the voltage impressed across the load, the common juncture of the resistance 9 and the glow discharge device 15 being connected to the cathode 7 of the electric discharge device 5. In order to adjust the magnitude of the voltage impressed on the load circuit, I provide a voltage divider 20 comprising a resistance 21 and an adjustable intermediate tap or connection 22. A resistance 21' may also be connected in series relation with resistance 21 to assure the maintenance of a predetermined minimum impedance in the input circuit of the electronic discharge device 10. The connection 22 is connected to the cathode 13 of the control electric discharge device 10. If the contact 22 is moved upwardly, the magnitude of the voltage impressed on the load circuit is increased, and, conversely, if the contact 22 is moved downwardly the value of the voltage maintained across the load circuit is decreased. I have found that the magnitude of the voltage impressed across the load circuit may be adjusted from values extending from 100 volts to 350 volts.

The circuit shown in Fig. 2 operates in substantially the same way as that described above in connection with Fig. 1. The glow discharge device 15 and the control discharge device 10 are responsive directly to the magnitude of the voltage of the load circuit and control the conductivity of the discharge device 5 to maintain the voltage of the load circuit constant. Due to the connection of the glow discharge device 15 between the positive terminal of the load circuit and the grid 14 of control discharge device 10, a greater range of control of output or load voltage is afforded. Furthermore, due to the appreciable impedance in the input circuit of the control discharge device 10, the capacitance 19 is reduced appreciably in size as compared with that value of filtering capacitance required to effect satisfactory operation where the glow discharge device is connected in the cathode circuit of the control discharge device.

Fig. 3 diagrammatically illustrates a still further embodiment of my invention and certain elements thereof correspond to those represented in Figs. 1 and 2 and have been assigned like reference numerals. Instead of employing a triode as shown in Figs. 1 and 2, I employ in this embodiment of my invention as a corresponding element an electric discharge device 23 comprising an anode 24, a cathode 25, a control grid 26, a screen grid 27 and may have a suppressor grid 28. The glow discharge device 15 is connected between the positive terminal of one of the associated principal circuits, such as the positive terminal of the load circuit, and the control grid 26. In order to maintain the potential of the screen grid 27 at a substantially constant value with respect to the cathode 25 and to extract thereby as large a percentage as possible of the amplification factor of the discharge device 23, I provide a glow discharge device 29 connected between the screen grid 27 and the cathode 25. The glow discharge device 29 is preferably designed to have a lower breakdown voltage than the glow discharge device 15. Certain features of the voltage divider including the glow discharge valve 29 and the electric discharge device 23 are disclosed and claimed in my copending patent application Serial No. 322,920 filed concurrently herewith and assigned to the assignee of the present application. By this arrangement of glow discharge devices I have found that by using an electric discharge device having an amplification factor of 1000 I utilize a very high percentage of the amplification factor. The glow discharge device 29 constitutes a part of a voltage divider connected between the positive terminal of the load circuit and the cathode 25 of discharge device 23. A resistance 30 is connected between the positive terminal of the load circuit and the screen grid 27 and constitutes the other part of the voltage divider. A suitable capacitance 31 may be connected between the negative terminal 4 and the cathode 25.

The operation of the embodiment of my invention shown in Fig. 3 is substantially the same as that explained above in connection with Figs. 1 and 2. However, due to the use of the discharge device 23 having a higher amplification factor and by the use of the glow discharge device 29, the precision of control of the voltage impressed on the load circuit is improved. Due to the voltage divider 20 the range of output voltage obtained from the regulating circuit is substantially increased over that afforded by the prior art arrangements.

While I have shown and described my invention as applied to particular systems of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, a direct current supply circuit, a direct current load circuit, an electric discharge device connected between said circuits for controlling the voltage of said load circuit and comprising a pair of principal electrodes and a control grid, a filtering capacitance connected between said control grid and one terminal of said supply circuit, means for varying the potential of said grid in response to the voltage of one of the first mentioned circuits comprising in series relation a resistance, a control electric discharge device and a second resistance, said second resistance constituting a part of the input circuit to said control electric discharge device and said control discharge device having an anode, a cathode and a control grid, means for connecting said anode to the control grid of the first mentioned discharge device, means for impressing on the control grid of said control electric discharge device a voltage which varies in response to the voltage of said one of the first mentioned circuits and comprising in series relation a glow discharge device connected between the grid of said control electric discharge device and the positive terminal of said one circuit, and a resistance connected between the grid of said control discharge device and the other terminal of said one circuit.

2. In combination, a direct current supply circuit, a direct current load circuit, an electric discharge device connected between said circuits for controlling the voltage of said load circuit and comprising a pair of principal electrodes and a grid, means for controlling the potential of said grid in response to the voltage of one of the first mentioned circuits comprising in series relation an impedance element and a control electric discharge device for transmitting variable amounts of current through said impedance element, said control discharge device having an anode, a cathode and a grid, and means responsive to the voltage of said one circuit for varying the potential of the last mentioned grid in response to the voltage of said one circuit and comprising a glow discharge device connected between the positive terminal of said one circuit and the last mentioned grid, a resistance connected between the grid of said control discharge device and the negative terminal of said one circuit, and a resistance connected between the cathode of said control discharge device and said negative terminal.

3. In combination, a direct current supply circuit, a load circuit, an electric discharge device connected between said circuits for controlling the voltage of said load circuit and comprising a pair of principal electrodes and a control grid, a filtering capacitance connected between said control grid and one terminal of said supply circuit, means for varying the potential of said grid in response to the voltage of one of the first mentioned circuits comprising in series relation a resistance and a control electric discharge device, said control discharge device having an anode, a cathode and a control grid, means for connecting said anode to the control grid of the first mentioned discharge device, means for impressing on the control grid of said control electric discharge device a voltage which varies in response to the voltage of said one of the first mentioned circuits and comprising in series relation a glow discharge device and a resistance, said glow discharge device being connected directly between the positive terminal of said one circuit and the control grid of said control electric discharge device, a resistance connected between the cathode of said control electric discharge device and said one terminal, and a filtering capacitance connected between said one terminal of said supply circuit and the control grid of said control electric discharge device.

4. In combination, a direct current supply circuit having positive and negative terminals, a load circuit, an electric discharge device connected between said circuits for controlling the voltage of said load circuit and comprising a pair of principal electrodes and a control grid, a filtering capacitance connected between said control grid and the negative terminal of said supply circuit, means for varying the potential of said control grid in response to the voltage of said supply circuit and comprising in series relation a resistance a control electric discharge device and a second resistance, said control electric discharge device having an anode, a cathode and a grid, means for connecting said anode to the control grid of the first mentioned electric discharge device, a filtering capacitance connected between the grid of said control electric discharge device and said negative terminal, and means comprising a high impedance input circuit for controlling the conductivity of said control discharge device to vary the amount of current transmitted through the first mentioned resistance comprising a glow discharge device connected between the positive terminal of said direct current circuit and the grid of said control discharge device, a resistance connected between said last mentioned grid and the negative terminal of said supply circuit, and a resistance connected between the cathode of said control electric discharge device and said negative terminal.

5. In combination, a direct current supply circuit having positive and negative terminals, a load circuit, an electric discharge device connected between said circuits for controlling an electrical condition of said load circuit and comprising a pair of principal electrodes and a control grid, means for varying the potential of said control grid in response to the voltage of one of the first mentioned circuits comprising in series relation a resistance, a control electric discharge device and a second resistance, said control discharge device having an anode, a cathode and a grid, means for connecting said anode to the control grid of said first mentioned discharge device, means for impressing upon the control grid of said control electric discharge device a potential which varies in accordance with the voltage of said one circuit and comprising a glow discharge device connected between the control grid of said control electric discharge device and said positive terminal and a resistance connected between the control grid of said control discharge device and said negative terminal, said second resistance being of a magnitude to produce across its terminal a voltage drop substantially greater than the voltage drop appearing across said glow discharge device, a resistance connected between said cathode of said control electric discharge device and said negative terminal, and filtering means connected between the control grid of the first mentioned discharge device and said negative terminal.

6. In combination, a direct current supply circuit, a direct current load circuit having positive and negative terminals, an electric discharge device connected between said circuits for controlling the voltage of said load circuit and comprising a pair of principal electrodes and a control grid, a filtering capacitance connected between said control grid and the negative terminal of said load circuit, means for varying the potential of said grid in response to the voltage of said load circuit and comprising in series relation a control electric discharge device having an anode, a cathode and a grid, a voltage divider connected across said load circuit and having an intermediate connection, means for connecting said cathode to said intermediate connection, means for connecting said anode to the grid of the first mentioned discharge device, a glow discharge device connected between the positive terminal of said load circuit and the grid of said control discharge device, a resistance connected between the grid of said control discharge device and the negative terminal of said load circuit, and a resistance connected between the cathode of said control discharge device and the negative terminal of said load circuit.

7. In combination, a direct current supply circuit, a direct current load circuit having positive and negative terminals, an electric discharge device connected between said circuits for controlling the voltage of said load circuit and comprising a pair of principal electrodes and a grid, means for varying the potential of said grid in response to the voltage of said load circuit and comprising a serially connected resistance and a control electric discharge device for transmitting variable amounts of unidirectional current through said resistance, said control discharge device having an anode, a cathode and a grid, a glow discharge device connected between the positive terminal of said load circuit and the grid of said control electric discharge device, resistance connected between the last mentioned grid and the negative terminal of said load circuit to vary the conductivity of said control electric discharge device in response to the magnitude of the voltage of said load circuit, and a resistance connected between the grid of said control discharge device and the negative terminal of said load circuit.

8. In combination, a direct current supply circuit, a direct current load circuit, an electric discharge device connected between said circuits for controlling the voltage of said load circuit and comprising a pair of principal electrodes and a grid, means for controlling the potential of said grid in response to the voltage of one of the first mentioned circuits comprising in series relation an impedance element and a control electric discharge device for transmitting variable amounts of current through said impedance element, said control discharge device having an anode, a cathode and a grid, means responsive to the voltage of said one circuit for controlling the potential of the last mentioned grid and comprising a glow discharge valve connected directly between a positive terminal of said one of said circuits and the last mentioned grid, and a variable impedance connected between said cathode and one terminal of said one circuit to adjust the value of voltage impressed upon said load circuit.

9. In combination, a direct current supply circuit, a direct current load circuit, an electric discharge device connected between said circuits for controlling the voltage of said load circuit and comprising a pair of principal electrodes and a grid, means for controlling the potential of said grid in response to the voltage of one of the first mentioned circuits comprising in series relation an impedance element and a control electric discharge device for transmitting variable amounts of current through said impedance element, said control discharge device having an anode, a cathode and a grid, a voltage divider connected across said one circuit and comprising in series relation a glow discharge device and a resistance for varying the potential of the grid of said control discharge device in response to the voltage of said one circuit, and a second voltage divider connected across said one circuit and including a resistance having at least a portion thereof connected in series relation between the cathode of said control discharge device and the negative terminal of said one circuit, said resistance being provided with an adjustable connection for controlling the potential of said cathode to establish the voltage impressed on said load circuit.

10. In combination, a direct current supply circuit, a direct current load circuit, an electric discharge device connected between said circuits for controlling the voltage of said load circuit and comprising a pair of principal electrodes and a grid, means for varying the potential of said grid in response to the magnitude of the voltage of one of the first mentioned circuits and comprising in series relation an impedance element and a control electric discharge device for transmitting variable amounts of unidirectional current through said impedance element, said control discharge device comprising an anode, a cathode, a control grid and a screen grid, means for varying the potential of said control grid of said control discharge device in response to the voltage of said one circuit comprising a voltage divider connected across said one circuit and including a glow discharge device connected between the positive terminal of said one circuit and said control grid and a resistance connected between said control grid and the negative terminal of said one circuit, and means for maintaining the potential of said screen grid at a substantially constant value above that of said cathode comprising a voltage divider connected between said positive terminal and said cathode and including a glow discharge device connected between said screen grid and said cathode and a resistance connected between said screen grid and said positive terminal.

11. In combination, a direct current supply circuit, a direct current load circuit, an electric discharge device connected between said circuits for controlling the voltage of said load circuit and comprising a pair of principal electrodes and a grid, means for varying the potential of said grid in response to the magnitude of the voltage of one of the first mentioned circuits and comprising in series relation an impedance element and a control electric discharge device for transmitting variable amounts of unidirectional current through said impedance element, said control discharge device comprising an anode, a cathode, a control grid and a screen grid, means for varying the potential of said control grid in response to the voltage of said one circuit comprising a voltage divider connected across said one circuit and including a glow discharge device connected between the positive terminal of said one circuit and said control grid and a resistance connected between said control grid and the negative terminal of said one circuit, means for maintaining the potential of said screen grid at a substantially constant value above that of said cathode comprising a voltage divider connected between said positive terminal and said cathode and including a glow discharge device connected between said screen grid and said cathode and a resistance connected between said screen grid and said positive terminal, and an adjustable impedance element connected between said cathode and thte negative terminal of said one circuit to establish the value of voltage impressed across said load circuit.

PAUL C. GARDINER.